United States Patent
Chen et al.

(10) Patent No.: US 8,055,072 B2
(45) Date of Patent: Nov. 8, 2011

(54) IMAGE DISPLAY PANEL AND DRIVING METHOD THEREOF

(75) Inventors: Shing-Chia Chen, Tainan County (TW); Ling-Hsiu Huang, Tainan County (TW)

(73) Assignee: Himax Technologies Limited, Tainan County (TW)

( * ) Notice: Subject to any disclaimer, the term of this patent is extended or adjusted under 35 U.S.C. 154(b) by 1015 days.

(21) Appl. No.: 11/945,334

(22) Filed: Nov. 27, 2007

(65) Prior Publication Data
US 2009/0136129 A1    May 28, 2009

(51) Int. Cl.
*G06K 9/00* (2006.01)

(52) U.S. Cl. ........ 382/168; 382/169; 382/172; 382/162; 382/132; 345/102; 345/690; 345/211; 345/214; 345/78

(58) Field of Classification Search ............. 382/168, 382/169, 162, 172, 117, 118, 132; 345/102, 345/690, 211, 214, 78
See application file for complete search history.

(56) References Cited

U.S. PATENT DOCUMENTS

| | | | | |
|---|---|---|---|---|
| 5,377,020 | A * | 12/1994 | Smitt | 358/3.14 |
| 5,970,164 | A * | 10/1999 | Bamberger et al. | 382/128 |
| 6,072,892 | A * | 6/2000 | Kim | 382/117 |
| 7,768,496 | B2 * | 8/2010 | Daly | 345/102 |
| 2001/0028737 | A1 * | 10/2001 | Takakura et al. | 382/162 |
| 2002/0094119 | A1 * | 7/2002 | Sahadevan | 382/132 |
| 2003/0091222 | A1 * | 5/2003 | Young et al. | 382/132 |
| 2007/0092139 | A1 * | 4/2007 | Daly | 382/169 |
| 2007/0298513 | A1 * | 12/2007 | Starzl et al. | 436/164 |
| 2009/0097747 | A1 * | 4/2009 | Chen et al. | 382/169 |

* cited by examiner

*Primary Examiner* — Brian Q Le
*Assistant Examiner* — Mek Bekele
(74) *Attorney, Agent, or Firm* — Thomas, Kayden, Horstemeyer & Risley, LLP (57) ABSTRACT

The invention provides image display panels. The image display panel comprises a histogram generator, a tone slope generator, and an image transformer. The histogram generator receives an original image, counts the pixels of different gray levels to generate a histogram distribution of the original image, and compares the pixel counts at every gray level with a first threshold count to identify the peaks of the histogram distribution. The tone slope generator generates a tone slope based on the histogram distribution and peaks of the histogram distribution. The image transformer transforms the original image into a modified image based on the tone slope.

5 Claims, 7 Drawing Sheets

IMAGE DISPLAY PANEL AND DRIVING METHOD THEREOF

BACKGROUND OF THE INVENTION

1. Field of the Invention

The present invention relates to image display panels and driving methods thereof.

2. Description of the Related Art

For conventional image display techniques, an original image is transformed into a modified image before image display to improve image contrast. During the transformation process, brightness is increased following detection of overly dark images and brightness is decreased following detection of overly bright images.

However, during the transformation process, original image noise signals may be amplified, thus negatively effecting image quality. Novel techniques to improve image contrast without amplifying noise signals are called for.

BRIEF SUMMARY OF THE INVENTION

The invention provides image display panels. The image display panel comprises a histogram generator, a tone slope generator, and an image transformer. The histogram generator receives an original image, counts the pixels of different gray levels to generate a histogram distribution for the original image, and compares the pixel counts at every gray level with a first threshold count to identify the peaks of the histogram distribution. The tone slope generator generates a tone slope based on the histogram distribution and peaks of the histogram distribution. The image transformer transforms the original image into a modified image based on the tone slope.

In some embodiments of the invention, the tone slope generator comprises a sectionalizing unit, a contrast improver, a noise reducer and an interpolator. The sectionalizing unit determines a plurality of reference gray levels. For each of the reference gray levels, the sectionalizing unit further determines a first gray level section and a second gray level section in the gray level axis of the histogram distribution. In the first gray level section, the gray levels are less than the corresponding reference gray level. In the second gray level section, the gray levels are greater than the corresponding reference gray level. For each of the reference gray levels, the contrast improver generates a modified reference gray level. The contrast improver sets the modified reference gray level greater than the corresponding reference gray level when the pixel count in the corresponding first gray level section is greater than the pixel count in the corresponding second gray level section, and sets the modified reference gray level less than the corresponding reference gray level when the pixel count in the corresponding first gray level section is less than the pixel count in the corresponding second gray level section. The noise reducer fine tunes the modified reference gray level. When there is at least one peak in the corresponding first and second gray level sections, the noise reducer moves the modified reference gray level toward the corresponding reference gray level. Then, a tone slope is generated by the interpolator. The tone slope maps the reference gray levels to the corresponding modified reference gray levels.

The invention further discloses driving methods of the image display panels of the invention.

The above and other advantages will become more apparent with reference to the following description taken in conjunction with the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description shows some embodiments carrying out the invention. This description is made for the purpose of illustrating the general principles of the invention and should not be taken in a limiting sense. The scope of the invention is best determined by reference to the appended claims.

Figure 1:
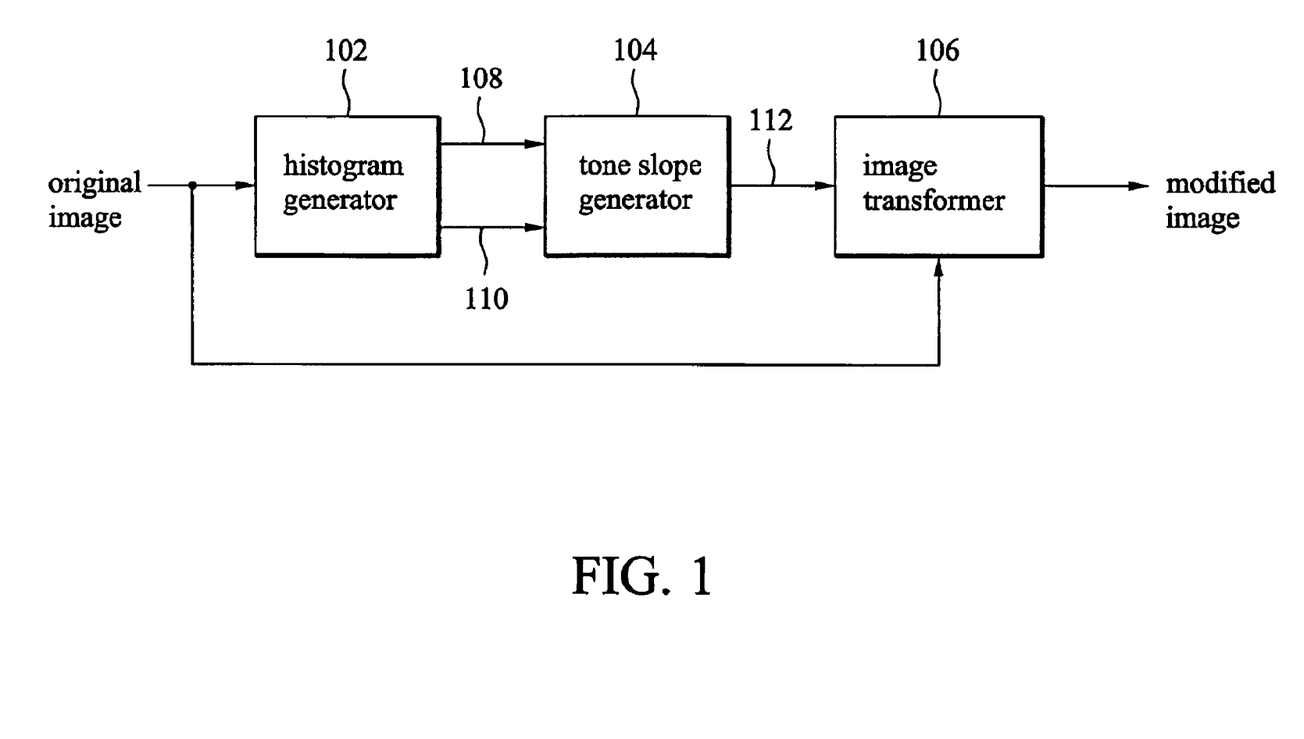
FIG. 1 is a block diagram, illustrating an embodiment of the image display panel of the invention.

FIG. 1 is a block diagram, illustrating an embodiment of the image display panel of the invention. The image display panel comprises a histogram generator 102, a tone slope generator 104 and an image transformer 106. The histogram generator 102 receives an original image, counts the pixels of different gray levels to generate a histogram distribution 108 for the original image, and compares the pixel counts at every gray level with a first threshold count to identify the peaks of the histogram distribution (110). The tone slope generator 104 generates a tone slope 112 based on the histogram distribution 108 and the peaks of the histogram distribution (110). The image transformer 106 transforms the original image into a modified image based on the tone slope 112.

Figure 2:
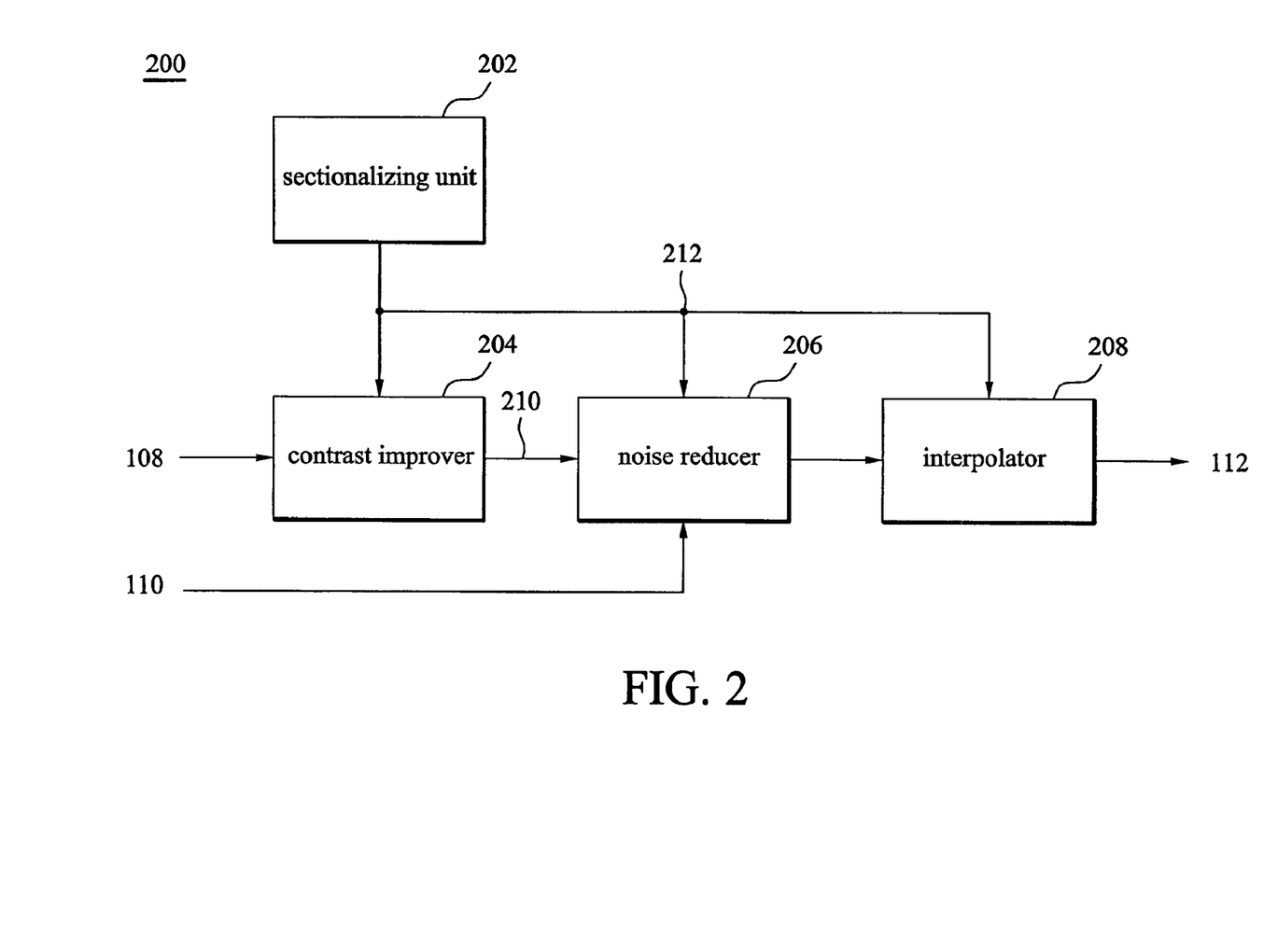
FIG. 2 is a block diagram, illustrating an embodiment of the tone slope generator 108.

FIG. 2 is a block diagram, illustrating an embodiment of the tone slope generator 108. The tone slope generator 200 comprises a sectionalizing unit 202, a contrast improver 204, a noise reducer 206 and an interpolator 208. T sectionalizing unit 202 determines a plurality of reference gray levels. For each of the reference gray levels, the sectionalizing unit 202 further determines a first gray level section and a second gray level section in the gray level axis of the histogram distribution. In the first gray level section, the gray levels are less than the corresponding reference gray level. In the second gray level section, the gray levels are greater than the corresponding reference gray level. The value of the reference gray levels and their corresponding first and second gray level sections are transmitted by signal line 212. For each of the reference gray levels, the contrast improver 204 generates a modified reference gray level 210. After analyzing the histogram distribution 108, the contrast improver 204 sets the modified reference gray level to be greater than the corresponding reference gray level when the pixel count in the corresponding first gray level section is greater than the pixel count in the corresponding second gray level section, and sets the modified reference gray level to be less than the corresponding reference gray level when the pixel count in the corresponding first gray level section is less than the pixel count in the corresponding second gray level section. The modified reference gray level 210 is fine tuned by the noise reducer 206. The noise reducer 206 moves the modified reference gray level 210 toward the corresponding reference gray level when there is at least one peak in the corresponding first and second gray level sections. Based on the output signals of the noise reducer 206 and the sectionalizing unit 202, the interpolator 208 generates a tone slope 112. The tone slope 112 maps the reference gray levels to the corresponding modified reference gray levels. The interpolator 208 may generate the tone slope by piecewise linear interpolation.

Figure 3:
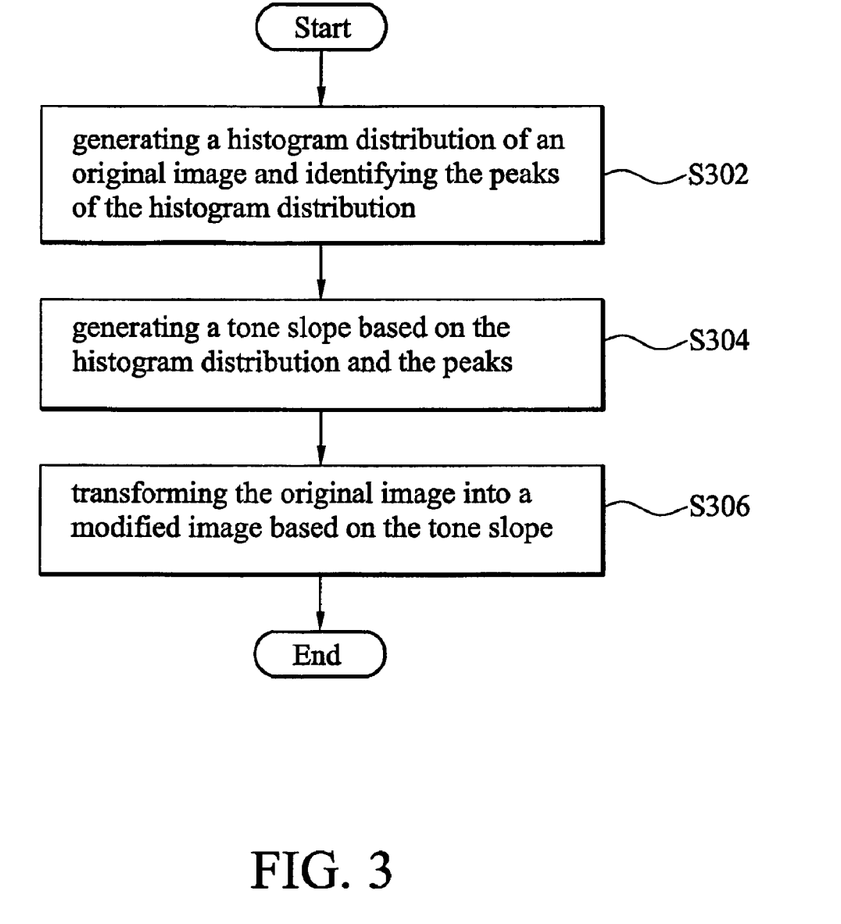
FIG. 3 is a flowchart showing the image display panel driving method of the invention.

FIG. 3 is a flowchart showing the image display panel driving method of the invention. In step s302, a histogram distribution of an original image is generated by counting the pixels of different gray levels, and the pixel counts at every gray level are compared with a first threshold count to identify the peaks of the histogram distribution. In step S304, a tone slope is generated based on the histogram distribution and peaks of the histogram distribution. In step S306, the original image is transformed into a modified image based on the tone slope. The modified image is the image actually displayed by the image display panel.

Figure 4:
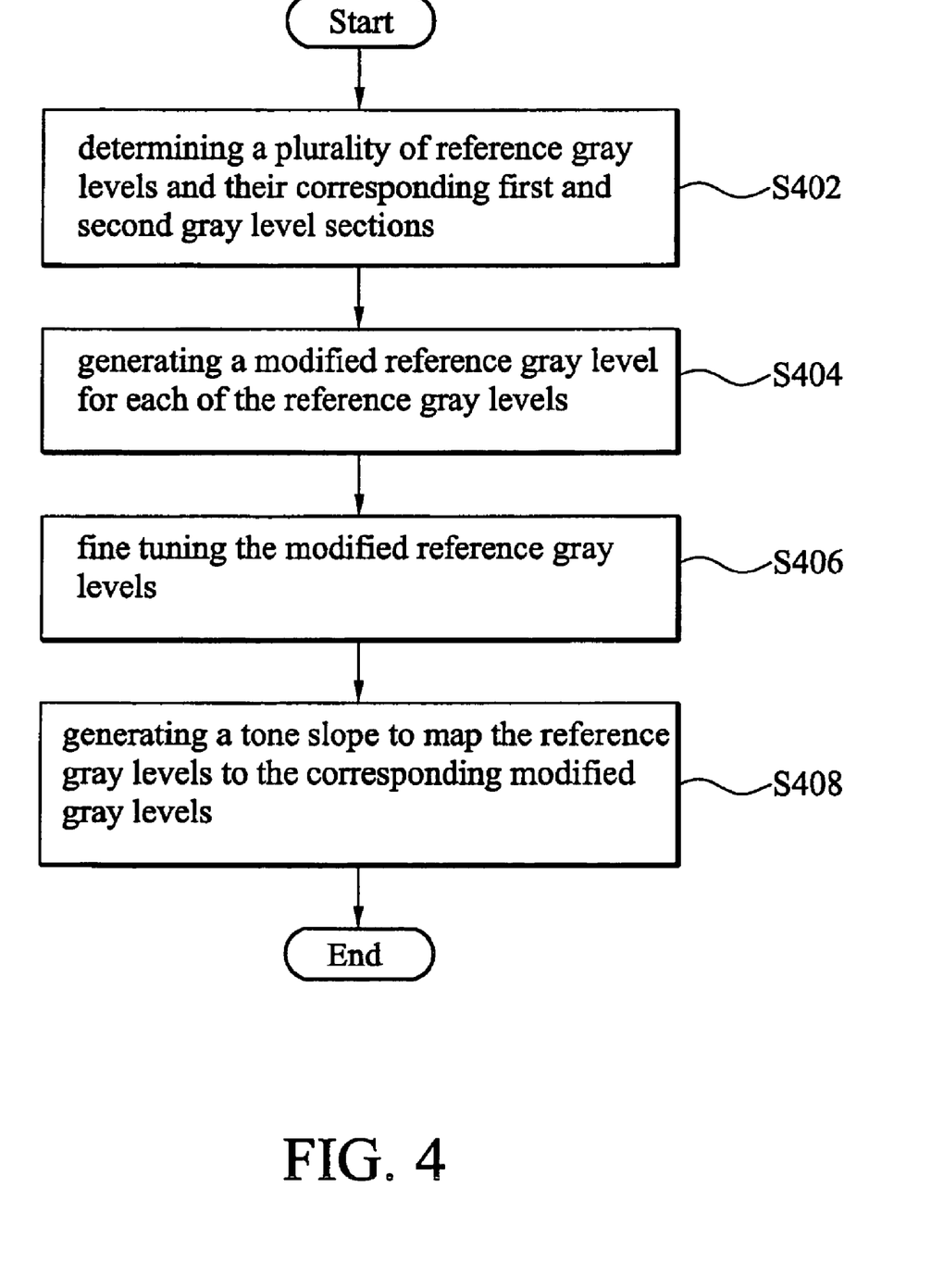
FIG. 4 is a flowchart showing an embodiment of step S304.

FIG. 4 is a flowchart showing an embodiment of step S304. In step S402, a plurality of reference gray levels and their corresponding first and second gray level sections are set. The gray levels in the first gray level section are less than the corresponding reference gray level and the gray levels in the second gray level section are greater than the corresponding reference gray level. In step S404, for each of the reference gray levels, a modified reference gray level is generated. The modified reference gray level is set to be greater than the corresponding reference gray level when the pixel count in the corresponding first gray level section is greater than the pixel count in the corresponding second gray level section and is set to be less than the corresponding reference gray level when the pixel count in the corresponding first gray level section is less than the pixel count in the corresponding second gray level section. The modified reference gray levels are fine tuned in step S406. In step S406, the modified reference gray level is moved toward the corresponding reference gray level when there is at least one peak in the corresponding first and second gray level sections. In step S408, a tone slope is generated and the reference gray levels are mapped to the corresponding modified reference gray levels by the tone slop. In some embodiments, step S408 is implemented by piecewise linear interpolation.

In some embodiments, the modified reference gray level is fine tuned to be equal to the corresponding reference gray level when the pixel count of the peak in the corresponding first and second gray level sections is greater than a second threshold count.

In some embodiments, the first threshold count is one-eighth that of the total pixel amount of the image display panel, and the second threshold count is half that of the total pixel amount of the image display panel. For example, if an image display panel has 44744 pixels, the first pixel threshold count is 5593 and the second pixel threshold count is 22372. The histogram distribution is considered having a peak when the pixel count of the gray level is greater than 5593. The greater the pixel count of the peak is, the closer the modified reference gray level is moved toward the corresponding reference gray level. When the pixel count is greater than 22372, the modified reference gray level is set equal to the corresponding reference gray level.

Figure 5:
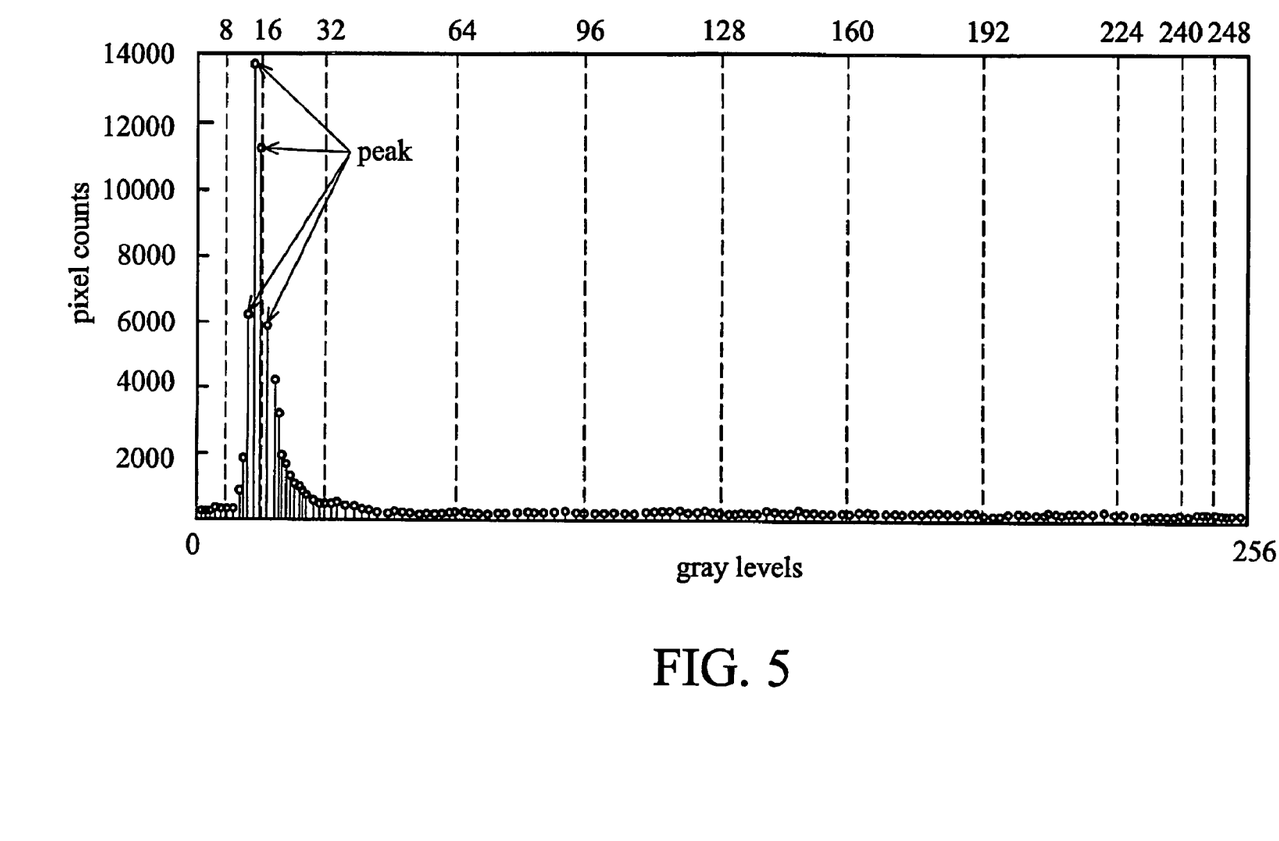
FIG. 5 shows a histogram distribution of an original image.
Figure 6:
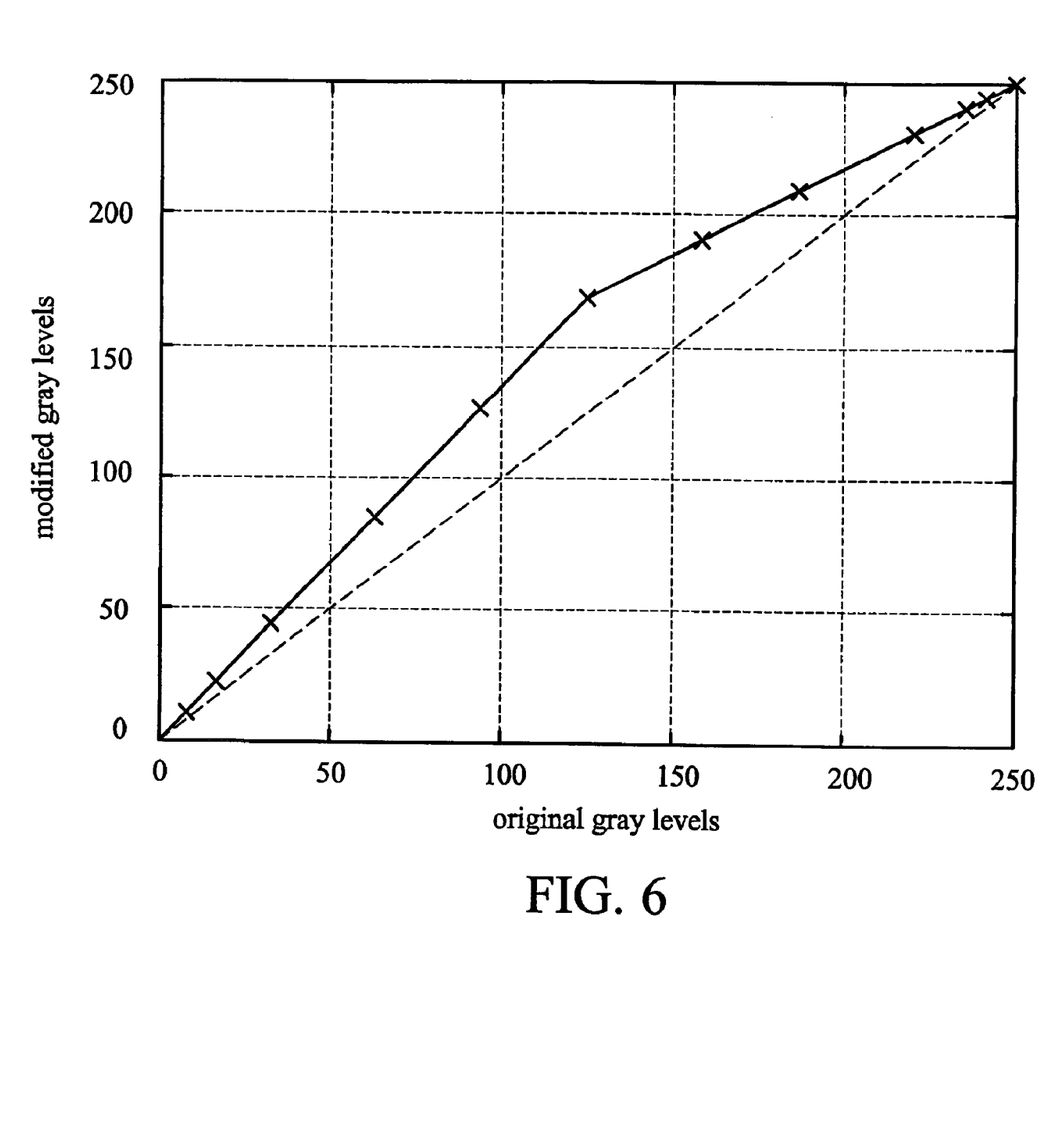
FIG. 6 shows a tone slope without fine tuning.
Figure 7:
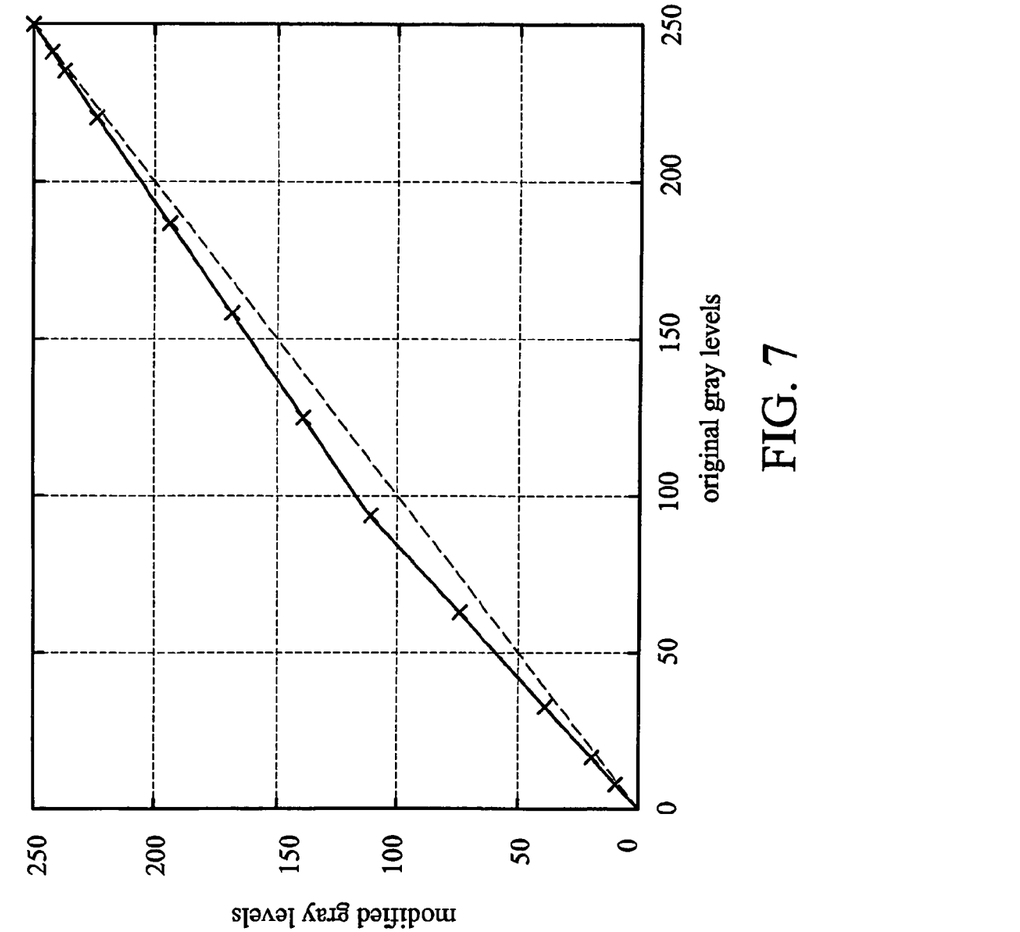
FIG. 7 shows a tone slope with fine tuning.

FIGS. 5-7 describes an example of the invention. FIG. 5 is a histogram distribution of an original image. The pixel counts of different gray levels are shown by the histogram distribution. In this embodiment, the first threshold count is 5593, and there are four peaks in the histogram distribution. In this embodiment, the reference gray levels are 8, 16, 32, 64, 96, 128, 160, 192, 224, 240 and 248. The first and second gray level sections of reference gray level 128 are 0-128 and 128-256, respectively. The first and second gray level sections of reference gray level 96 are 64-96 and 96-128, respectively. The first and second gray level sections of reference gray level 64 are 0-64 and 64-128, respectively. The first and second gray level sections of reference gray level 32 are 0-32 and 32-64, respectively. The first and second gray level sections of reference gray level 16 are 0-16 and 16-32, respectively. The first and second gray level sections of reference gray level 8 are 0-8 and 8-16, respectively. The first and second gray level sections of the reference gray levels 160, 192, 224, 240 and 248 are set by analogy.

FIG. 6 shows a tone slope without fine tuning. FIG. 7 shows a tone slope with fine tuning. FIG. 7 is less distorted than FIG. 6. The tone slope shown in FIG. 7 shows that the original image can transform into a modified image without amplifying the noise of the original image.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded to the broadest interpretation so as to encompass all such modifications and similar arrangements.

What is claimed is:

1. An image display panel, comprising
a histogram generator, receiving an original image, counting the pixels of different gray levels to generate a histogram distribution of the original image, and comparing the pixel counts at every gray level with a first threshold count to identify the peaks of the histogram distribution;
a tone slope generator, generating a tone slope based on the histogram distribution and the peaks of the histogram distribution; and
an image transformer, transforming the original image into a modified image based on the tone slope wherein the tone slope generator comprises: a sectionalizing unit, determining a plurality of reference gray levels and, for each of the reference gray levels, determining a first gray level section in which the gray levels are less than the reference gray level and a second gray level section in which the gray levels are greater than the reference gray level; a contrast improver, generating a modified reference gray level for each of the reference gray levels, and setting the modified reference gray level to be greater than the corresponding reference gray level when the pixel count in the corresponding first gray level section is greater than the pixel count in the corresponding second gray level section and setting the modified reference gray level to be less than the corresponding reference gray level when the pixel count in the corresponding first gray level section is less than the pixel count in the corresponding second gray level section; a noise reducer, moving the modified reference gray level toward the corresponding reference gray level when there is at least one peak in the corresponding first and second gray level sections; and an interpolator, generating the tone slope to map the reference gray levels to the corresponding modified reference gray levels.

2. The image display panel as claimed in claim 1, wherein the interpolator generates the tone slope by piecewise linear interpolation.

3. A method of driving an image display panel, comprising:
generating a histogram distribution of an original image by counting the pixels of different gray levels, and comparing the pixel counts at every gray level with a first threshold count to identify the peaks of the histogram distribution;

generating a tone slope based on the histogram distribution and peaks of the histogram distribution;

transforming the original image into a modified image based on the tone slope to actually drive the image display panel wherein the step of generating the tone slope comprises: determining a plurality of reference gray levels and, for each of the reference gray levels, determining a first gray level section in which the gray levels are less than the reference gray level and a second gray level section in which the gray levels are greater than the reference gray level; generating a modified reference gray level for each of the reference gray levels, and setting the modified reference gray level to be greater than the corresponding reference gray level when the pixel count in the corresponding first gray level section is greater than the pixel count in the corresponding second gray level section and setting the modified reference gray level to be less than the corresponding reference gray level when the pixel count in the corresponding first gray level section is less than the pixel count in the corresponding second gray level section; moving the modified reference gray level toward the corresponding reference gray level when there is at least one peak in the corresponding first and second gray level sections; and generating the tone slope to map the reference gray levels to the corresponding modified reference gray levels.

4. The method as claimed in claim 3, wherein the step of generating the tone slope mapping the reference gray levels to the corresponding modified reference gray levels is implemented by piecewise linear interpolation.

5. The method as claimed in claim 4, further comprising setting the modified reference gray level equal to the corresponding reference gray level when the pixel count of the peak in the corresponding first and second gray level sections is greater than a second threshold count.

* * * * *